United States Patent
Szczepanski

(10) Patent No.: US 11,143,080 B1
(45) Date of Patent: Oct. 12, 2021

(54) SYSTEMS AND METHODS FOR MONITORING A TEMPERATURE OF A PARTICULATE FILTER OF AN EXHAUST AFTERTREATMENT SYSTEM

(71) Applicant: DENSO International America, Inc., Southfield, MI (US)

(72) Inventor: Edward Szczepanski, Grosse Pointe Farms, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 0 days.

(21) Appl. No.: 16/869,973

(22) Filed: May 8, 2020

(51) Int. Cl.
| | |
|---|---|
| *F01N 9/00* | (2006.01) |
| *F01N 3/027* | (2006.01) |
| *F01N 11/00* | (2006.01) |

(52) U.S. Cl.
CPC ............... *F01N 9/00* (2013.01); *F01N 3/027* (2013.01); *F01N 11/002* (2013.01); *F01N 9/002* (2013.01); *F01N 2900/08* (2013.01); *F01N 2900/1602* (2013.01); *F01N 2900/1606* (2013.01)

(58) Field of Classification Search
CPC .......... F01N 9/00; F01N 3/027; F01N 11/002; F01N 9/002; F01N 2900/1602; F01N 2900/1606; F01N 2900/08
See application file for complete search history.

(56) References Cited

U.S. PATENT DOCUMENTS

| | | | |
|---|---|---|---|
| 10,233,811 B2 | 3/2019 | Smith et al. | |
| 10,267,193 B2 | 4/2019 | Crawford et al. | |
| 2012/0117946 A1* | 5/2012 | Gonze | F01N 3/027 60/274 |
| 2018/0094556 A1* | 4/2018 | Kurtz | F01N 3/021 |
| 2019/0077244 A1* | 3/2019 | Huang | B60K 6/48 |
| 2019/0301329 A1 | 10/2019 | Zink et al. | |

\* cited by examiner

*Primary Examiner* — Brandon D Lee
(74) *Attorney, Agent, or Firm* — Burris Law, PLLC

(57) ABSTRACT

A method includes determining an amount of particulate mass in a particulate filter of an exhaust aftertreatment system. The method includes, when the amount of particulate mass in the particulate filter is greater than a threshold particulate mass value, receiving engine state information, providing electric power to the particulate filter, and obtaining an impedance value of the particulate filter in response to providing the electric power. The method includes, when the amount of particulate mass in the particulate filter is greater than a threshold particulate mass value, determining a temperature of the particulate filter based on the impedance value, and adjusting a magnitude of the electric power in response to at least one of (i) the temperature of the particulate filter satisfying one or more temperature metrics and (ii) the engine state information satisfying one or more engine state metrics.

20 Claims, 7 Drawing Sheets

SYSTEMS AND METHODS FOR MONITORING A TEMPERATURE OF A PARTICULATE FILTER OF AN EXHAUST AFTERTREATMENT SYSTEM

FIELD

The present disclosure relates to systems and methods for monitoring a temperature of exhaust aftertreatment system components.

BACKGROUND

The statements in this section merely provide background information related to the present disclosure and may not constitute prior art.

An internal combustion engine (ICE) of a vehicle typically includes an exhaust system to route or handle exhaust gas (i.e., combusted gases) expelled from one or more cylinders of the ICE. Furthermore, an exhaust aftertreatment system in communication with the ICE may reduce toxic gases and pollutants of the exhaust gas into less toxic pollutants by catalyzing a redox reaction.

The exhaust aftertreatment system may operate at various temperature ranges, and the temperature ranges may correlate to a propulsion mode of the vehicle. As an example, when the vehicle is in an electric propulsion mode, the exhaust aftertreatment system operates within a first temperature range. As another example, when the vehicle is in an ICE propulsion mode, the exhaust aftertreatment system may operate at a second temperature range that is greater than the first temperature range. Accordingly, the exhaust aftertreatment system may include one or more temperature sensors configured to obtain temperature data of the exhaust aftertreatment system.

SUMMARY

This section provides a general summary of the disclosure and is not a comprehensive disclosure of its full scope or all of its features.

The disclosure provides a method that includes determining an amount of particulate mass in a particulate filter of an exhaust aftertreatment system. When the amount of particulate mass in the particulate filter is greater than a threshold particulate mass value, the method includes receiving engine state information. When the amount of particulate mass in the particulate filter is greater than a threshold particulate mass value, the method includes providing electric power to the particulate filter. When the amount of particulate mass in the particulate filter is greater than a threshold particulate mass value, the method includes obtaining an impedance value of the particulate filter in response to providing the electric power. When the amount of particulate mass in the particulate filter is greater than a threshold particulate mass value, the method includes determining a temperature of the particulate filter based on the impedance value. When the amount of particulate mass in the particulate filter is greater than a threshold particulate mass value, the method includes adjusting a magnitude of the electric power in response to at least one of (i) the temperature of the particulate filter satisfying one or more temperature metrics and (ii) the engine state information satisfying one or more engine state metrics.

The present disclosure provides a system including a processor and a nontransitory computer-readable medium including instructions that are executable by the processor. The instructions include determining an amount of particulate mass in a particulate filter of an exhaust aftertreatment system. The instructions include, when the amount of particulate mass in the particulate filter is greater than a threshold particulate mass value: receiving engine state information, providing electric power to the particulate filter, and obtaining an impedance value of the particulate filter in response to providing the electric power. The instructions include, when the amount of particulate mass in the particulate filter is greater than a threshold particulate mass value: determining a temperature of the particulate filter based on the impedance value, and adjusting a magnitude of the electric power in response to at least one of (i) the temperature of the particulate filter satisfying one or more temperature metrics and (ii) the engine state information satisfying one or more engine state metrics.

The present disclosure provides a vehicle that includes an exhaust aftertreatment system including a particulate filter. The vehicle includes a processor and a nontransitory computer-readable medium including instructions that are executable by the processor. The instructions include determining an amount of particulate mass in the particulate filter. The instructions include, when the amount of particulate mass in the particulate filter is greater than a threshold particulate mass value: receiving engine state information, providing electric power to the particulate filter, and obtaining an impedance value of the particulate filter in response to providing the electric power. The instructions include, when the amount of particulate mass in the particulate filter is greater than a threshold particulate mass value: determining a temperature of the particulate filter based on the impedance value, and adjusting a magnitude of the electric power in response to at least one of (i) the temperature of the particulate filter satisfying one or more temperature metrics and (ii) the engine state information satisfying one or more engine state metrics.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
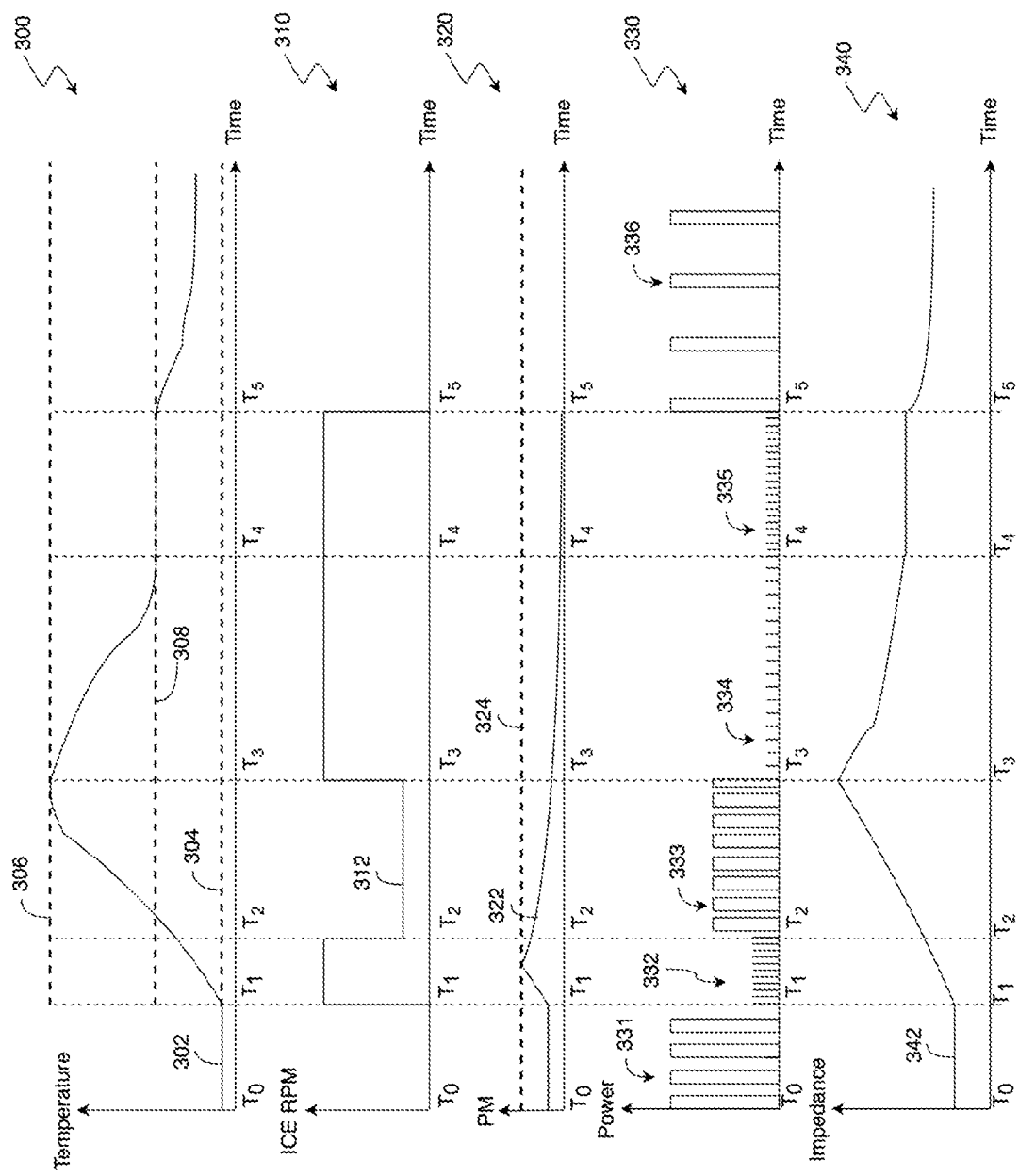
Figure 4:
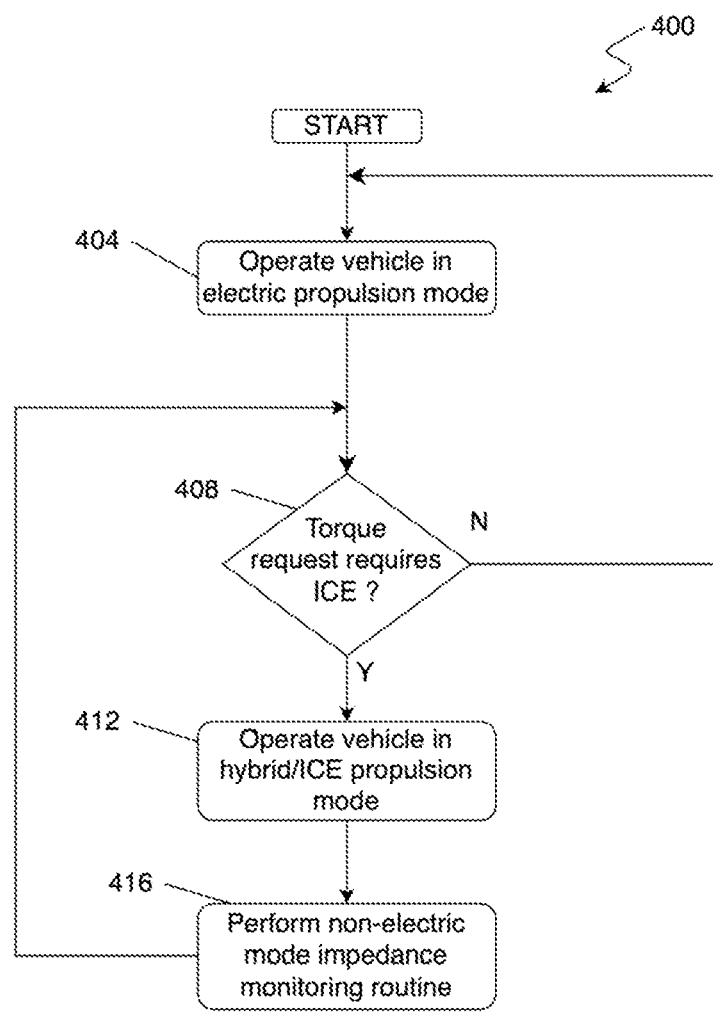
Figure 5:
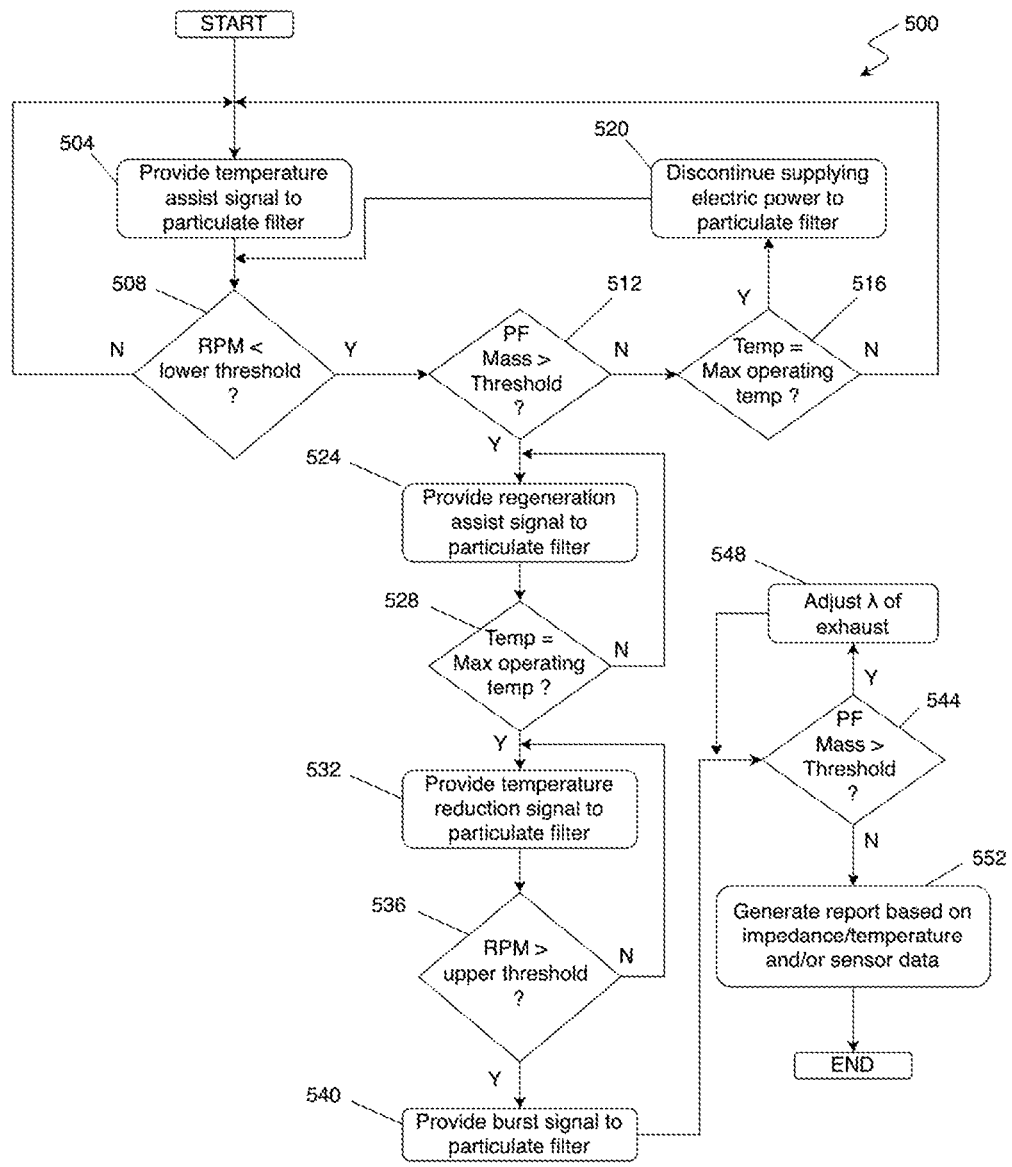

FIG. 3 illustrates graphs of the temperature of a particulate filter as a function of time, a number of revolutions per minute of an internal combustion engine (ICE RPM) as a function of time, an amount of accumulated particulate mass of a particulate filter (PM) as a function of time, electrical power supplied to a particular filter as a function of time, and the impedance of a particulate filter as a function of time according to the teachings of the present disclosure;

FIG. 4 is a flow chart for monitoring the impedance of an exhaust aftertreatment system according to the teachings of the present disclosure; and FIG. 5 is a flow chart for monitoring the impedance of an exhaust aftertreatment system during a non-electric propulsion mode according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A system for controlling and monitoring a temperature of a component (e.g., an electrically heated catalyst, a particulate filter, among others) in an exhaust aftertreatment system of an internal combustion engine (ICE) when the amount of particulate mass is greater than a threshold particulate mass value includes an engine state module and a power regulator module. The power regulator module includes various modules that receive engine state information from the engine state module, provide electric power applied to the particulate filter, obtain an impedance value of the particulate filter, determine a temperature of the particulate filter based on the impedance, and adjust the magnitude of the electric power applied to the particulate filter based on at least one of the temperature and the engine state information. By selectively adjusting the magnitude of the electric power applied to the particulate filter based on the impedance (and thus the temperature) and/or the engine state information, the exhaust aftertreatment system can accurately control and monitor the temperature while operating in various vehicle propulsion modes, such as an electric propulsion mode, a hybrid propulsion mode, and an ICE propulsion mode, without the use of temperature sensors.

Figure 1A:
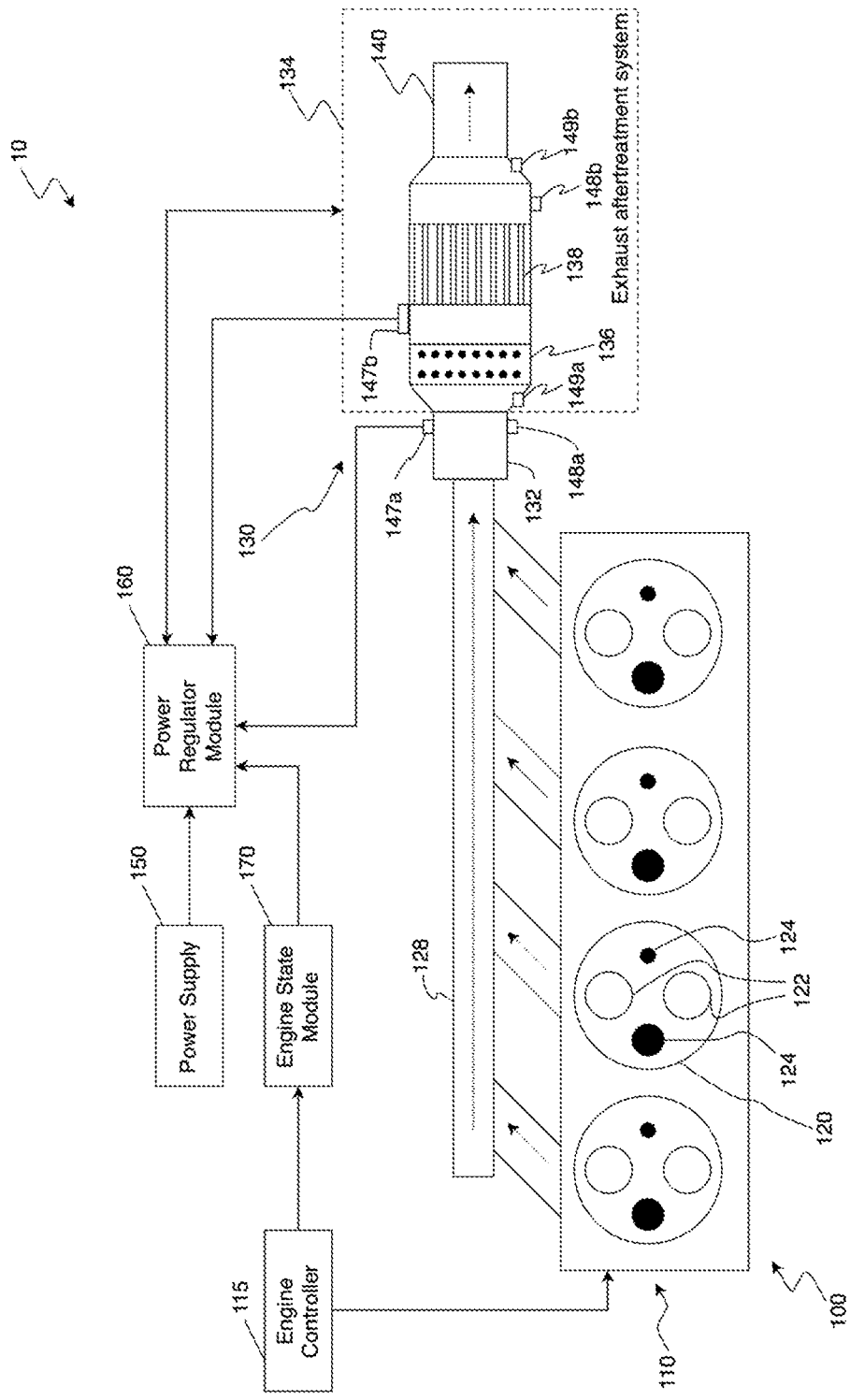
FIG. 1A illustrates a vehicle according to the teachings of the present disclosure.

Referring to FIG. 1A, a vehicle 10 that controls and monitors a temperature of a component (e.g., an electrically heated catalyst, a particulate filter, among others) of the vehicle 10 is shown. In some forms, the vehicle 10 includes an ICE 100, an exhaust system 130, a power supply 150, a power regulator module 160, and an engine state module 170.

The ICE 100 includes an engine controller 115 and a cylinder bank 110 that includes a plurality of cylinders 120. Each cylinder 120 includes at least two valves 122 (e.g., an intake valve and an exhaust valve), a fuel injector 124, and a spark initiator 126 (e.g., a spark plug). A manifold 128 is in fluid communication with the cylinder bank 110.

The exhaust system 130 includes an exhaust pipe 132 and an exhaust aftertreatment system 134 with various components to filter exhaust gas flowing therethrough. As an example, the exhaust aftertreatment system 134 includes a catalytic converter 136 (e.g., a three-way catalytic (TWC) converter, an electrically heated catalytic (EHC) converter, among others) and a particulate filter 138 disposed downstream from the catalytic converter 136. While the particulate filter 138 and the catalytic converter 136 are shown as individual components, it should be understood that the particulate filter 138 may be integrated within the catalytic converter 136 in some variations.

Figure 1B:
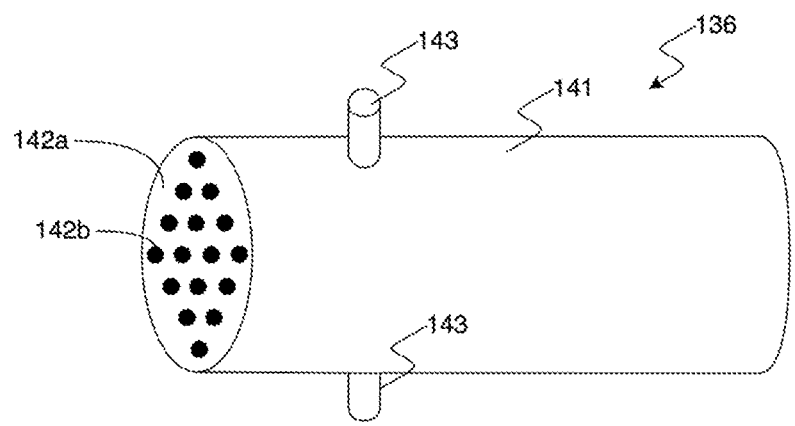
FIG. 1B is a catalytic converter according to the teachings of the present disclosure.

With reference to FIG. 1B, an example illustration of the catalytic converter 136 is shown. In some forms, the catalytic converter 136 is an EHC converter that includes an electrically conductive portion 141, a substrate 142a, a catalyst material 142b disposed on and supported by the substrate 142a, and electrical leads 143. In some forms, the electrically conductive portion 141 includes an electrically conductive material that is suitable for operating at predefined temperatures, such as up to 650° C. As an example, the electrically conductive portion 141 includes an electrically conductive material such as nickel, copper, chromium, molybdenum, tungsten, iron, aluminum, silicon, boron, an alloy thereof, among others. The electrically conductive portion 141 may surround the substrate 142a and the catalyst material 142b. For example, in some variations, the electrically conductive portion 141 is a metallic sheet surrounding the substrate 142a. In other variations, the electrically conductive portion 141 includes the electrically conductive material disposed on and/or within the substrate 142a such that an electrical current can flow from one portion or region of the catalytic converter 136 to another portion or region of the catalytic converter 136. In still other variations, the electrically conductive portion 141 can be one or more resistive heating elements disposed on and/or within the substrate 142a. In at least one variation, the substrate 142a is ceramic material with a honeycomb structure (e.g., a "brick"), and the catalyst material 142b can include platinum group metals (PGMs) disposed on the catalyst material 142b. For example, a washcoat containing PGMs can be applied to the substrate 142a. Accordingly, when the electrically conductive portion 141 receives electrical power from the power supply 150 via the power regulator module 160 and the electrical leads 143, the substrate 142a and/or the catalyst material 142b is heated, thereby enhancing the reduction of the nitrogen oxides (NOx) to nitrogen (N2), the oxidation of carbon monoxide (CO) to carbon dioxide ($CO_2$), and the oxidation of unburnt hydrocarbons (HCs) into $CO_2$ and water ($H_2O$) from exhaust gas flowing through the catalytic converter 136, as described below in further detail.

Figure 1C:
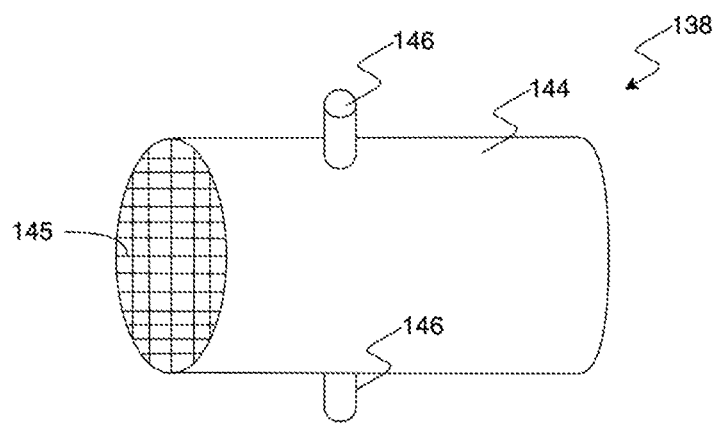
FIG. 1C is a particulate filter according to the teachings of the present disclosure.

With reference to FIG. 1C, an example illustration of the particulate filter 138 is shown. In some forms, the particulate filter 138 includes an electrically conductive portion 144, a filter element 145, and electrical leads 146. In some forms, the electrically conductive portion 144 includes an electrically conductive material that is suitable for operating at predefined temperatures, such as up to 650° C. As an example, the electrically conductive portion 144 includes a conductive material as described above. The electrically conductive portion 144 may surround the filter element 145. For example, and similar to the catalytic converter 136 describe above, in some variations, the electrically conductive portion 144 is a metallic sheet surrounding the filter element 145. In other variations, the electrically conductive portion 144 includes the electrically conductive material disposed on and/or within the filter element 145 such that an electrical current can flow from one portion or region of the particulate filter 138 to another portion or region of the particulate filter 138. Accordingly, when the electrically conductive portion 144 receives electrical power from the power supply 150 via the power regulator module 160 and the electrical leads 146, the filter element 145 is heated to assist in oxidation of particulate mass accumulated in the filter element 145, thereby increasing the efficiency of the ICE 100.

With reference to FIG. 1A, the exhaust system 130 includes a pre-converter universal heated exhaust gas oxygen (UHEGO) sensor 147a upstream from the catalytic converter 136 and a post-converter UHEGO sensor 147b disposed downstream from the catalytic converter 136 and upstream from the particulate filter 138. In some variations of the present disclosure, the pre-converter UHEGO sensor 147a and the post-converter UHEGO sensor 147b are disposed in the exhaust pipe 132. The pre-converter UHEGO sensor 147a and the post-converter UHEGO sensor 147b are in communication with the engine controller 115 by way of, for example, a vehicle communication network (not shown) such as a controller area network (CAN), a local interconnect network (LIN), among others. It should be understood that a UHEGO sensor provides real time lambda ($\lambda$) values in contrast to simple "rich" and "lean" indicators as with heat exhaust gas oxygen (HEGO) sensors. That is, a UHEGO sensor provides an actual $\lambda$ value for an exhaust gas flowing past the UHEGO sensor. It should also be understood that as used herein the term "lambda" and the symbol "$\lambda$" refer to the air-fuel ratio in an exhaust gas where $\lambda$ equal to 1.0 ($\lambda=1.0$) refers to the stoichiometric air-fuel ratio, i.e., the exhaust gas contains the exact amount of fuel and air needed for stoichiometric combustion. Also, $\lambda<1.0$ refers to an air-fuel ratio for exhaust gas with more fuel than air needed for stoichiometric combustion (also referred to herein as "rich" or "rich mixture"), and $\lambda>1.0$ refers to an air-fuel ratio for exhaust gas with less fuel than air needed for stoichiometric combustion (also referred to herein as "lean" or "lean mixture"). In some variations, the UHEGO sensors 147a, 147b may be replaced with sensors that generate information indicating that the mixture is one of a "rich mixture" or a "lean mixture" without providing an actual A value of the exhaust gas.

In some forms, the exhaust system 130 includes at least one PF sensor, illustratively shown as a pre-converter particulate sensor 148a (e.g., a radio frequency (RF) particulate filter sensor), a post-converter particulate sensor 148b, a pre-converter pressure sensor 149a, and a post-converter pressure sensor 149b. The pre-converter and post-converter particulate sensors 148a, 148b monitor and estimate particulate mass accumulation in the particulate filter 138. The pre-converter and post-converter pressure sensors 149a, 149b measure pressure upstream and downstream from the particulate filter 138, respectively. The pre-converter and post-converter particulate sensors 148a, 148b and the pre-converter and post-converter pressure sensors 149a, 149b are in communication with the engine controller 115 by way of, for example, a vehicle communication network (not shown), such as a CAN, a LIN, among others. The engine controller 115 is configured to calculate an amount of particulate mass accumulated in the particulate filter 138 based on sensor data received from at least one of the pre-converter and post-converter particulate sensors 148a, 148b and the pre-converter and post-converter pressure sensors 149a, 149b.

With continued reference to FIG. 1A, the power supply 150 is configured to provide electrical power to various components of the vehicle 10. As an example, the power supply 150 includes a direct current (DC) power source (e.g., a battery) configured to provide DC electrical power. As another example, the power supply 150 includes an alternating current (AC) power source and a rectifier circuit configured to provide the DC electrical power.

The power regulator module 160 includes one or more modules for monitoring an impedance of the particulate filter 138. Additionally, the power regulator module 160 includes one or more modules for controlling a magnitude of the electrical power supplied to the particulate filter 138. The functionality of the power regulator module 160 is described below in further detail with reference to FIGS. 2A-2B.

The engine state module 170 is configured to provide various engine state information associated with the vehicle 10 to the power regulator module 160. In some forms, the power regulator module 160 is configured to selectively provide electrical power to the particulate filter 138 based on the engine state information satisfying one or more engine state metrics, as described below in further detail. As an example, the engine state information may include information representing torque requests and, in some variations, information indicating whether a torque request is associated with a request to activate the ICE 100. As another example, the engine state information may include information indicating an engine speed of the vehicle 10 and, in some variations, information indicating whether the engine speed is greater than a threshold engine speed.

As yet another example, the engine state information provided by the engine state module 170 may include propulsion state information of the vehicle (e.g., the vehicle 10 is in an electric propulsion mode, an ICE propulsion mode, or a hybrid propulsion mode (i.e., a combination of the electric propulsion mode and the ICE propulsion mode)).

During the electric propulsion mode, the power supply 150 (and other power electronics systems not shown) generate the propulsion forces to drive (i.e., power or move) the vehicle 10. Furthermore, during the operation of the vehicle 10 in the electric propulsion mode, the ICE 100 is deactivated, as the vehicle 10 is propelled by electrical power from the power supply 150. Accordingly, no exhaust gas flow is directed through the exhaust aftertreatment system 134. However, to facilitate transitions between various propulsion modes (e.g., from the electric propulsion mode to the ICE mode or hybrid propulsion mode), the catalytic converter 136 may be supplied with electric power from the power supply 150 via the power regulator module 160 such that the temperature of the catalytic converter 136 (i.e., the substrate 142a and/or catalyst material 142b) is greater than a minimum lightoff threshold temperature (e.g., 450° C.), as described below in further detail. As used herein, the "lightoff temperature" refers to a temperature in which catalytic reactions are initiated with the catalytic converter 136.

During the ICE propulsion mode, the ICE 100 generates the propulsion forces to drive the vehicle 10. During the hybrid propulsion mode, the power supply 150 (and other power electronics systems not shown) and the ICE 100 generate the propulsion forces to drive the vehicle. Furthermore, during the operation of the vehicle 10 in the ICE propulsion mode or the hybrid propulsion mode, the engine controller 115 directs fuel via the fuel injectors 124 and air via the valves 122 (i.e., intake valves) into each of the cylinders 120. The engine controller 115 also directs firing of each of the spark initiators 126 such that the fuel plus air mixture in each cylinder 120 is combusted and expelled from the cylinders 120 via the valves 122 (i.e., exhaust valves) as exhaust gas (not labeled). To execute the functionality described herein, the engine controller 115 may include a processor configured to execute instructions stored in a nontransitory computer-readable medium, such as a random-access memory (RAM) and/or a read-only memory (ROM).

The exhaust gas expelled from the cylinders 120 flows through the manifold 128, the exhaust pipe 132, the catalytic converter 136, and the particulate filter 138, and the exhaust gas exits the exhaust system 130 at outlet 140. As the exhaust gas flows through the exhaust system 130, the catalytic converter 136 provides reduction of NOx to N2, oxidation of CO to $CO_2$, and oxidation of unburnt HCs into $CO_2$ and $H_2O$ (collectively referred to as the treatment of exhaust gas flow). To provide the treatment of the exhaust gas flow, the catalytic converter 136 may be supplied with electric power from the power supply 150 via the power regulator module 160 such that the temperature of the catalytic converter 136 is greater than an average lightoff threshold temperature (e.g., 465° C.) and less than a maximum operating temperature (e.g., 650° C.).

Figure 2A:
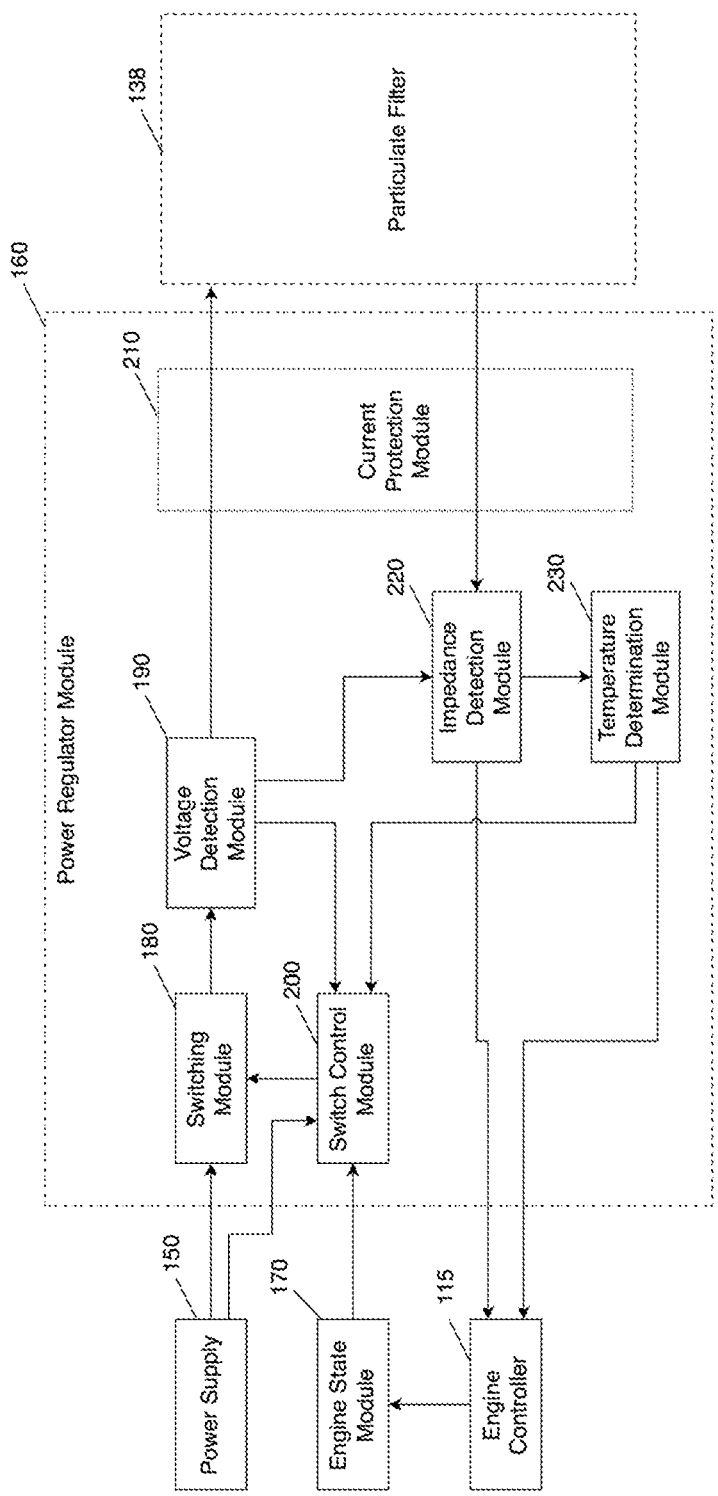
FIG. 2A is a block diagram of a system for monitoring a temperature of an exhaust aftertreatment system according to the teachings of the present disclosure.
Figure 2B:
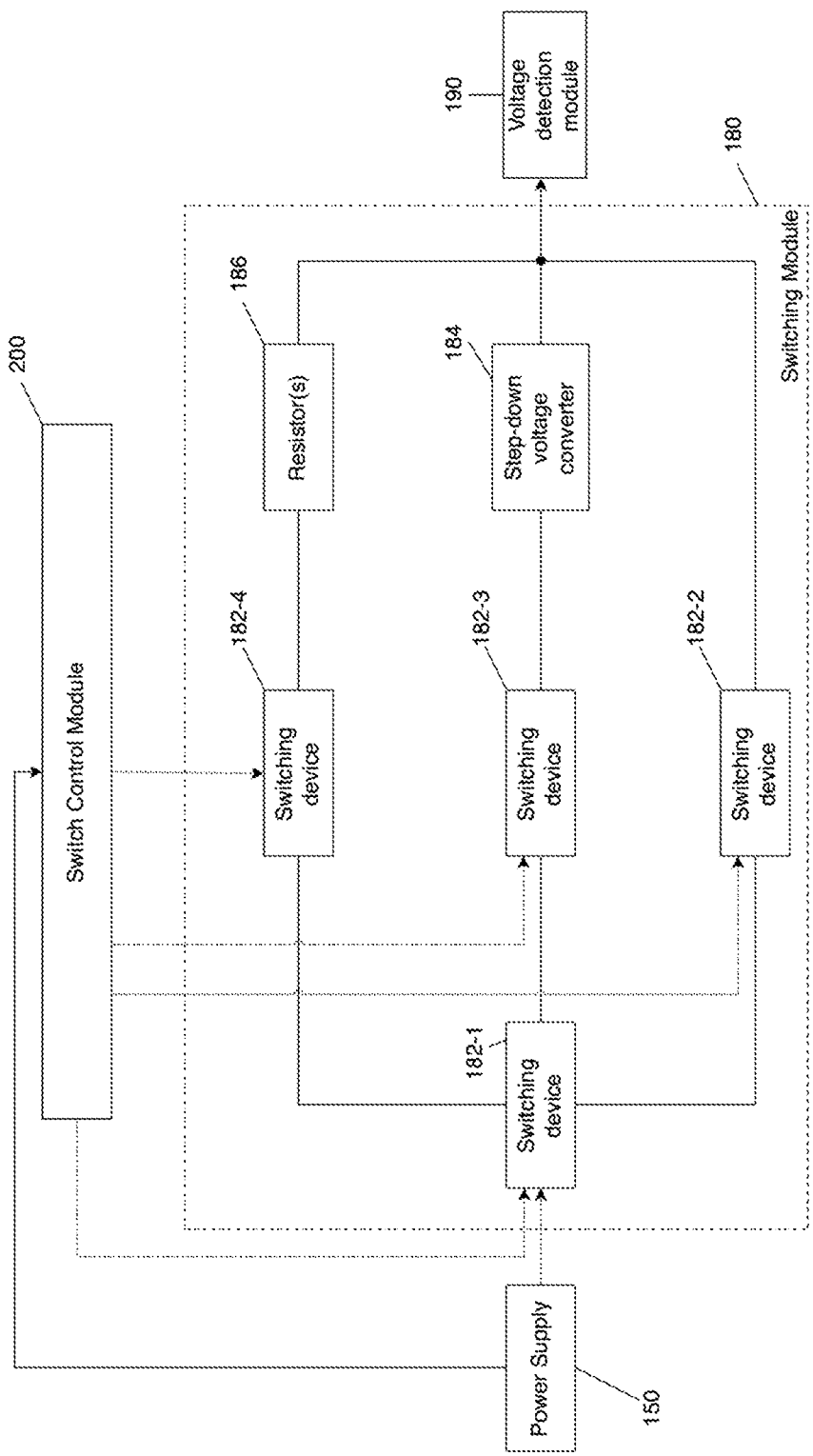
FIG. 2B is a block diagram illustrating various components of a switching module of the system of FIG. 2A according to the teachings of the present disclosure.

Referring to FIGS. 2A-2B, an example functional block diagram of the power regulator module 160 is shown. The power regulator module 160 may include a switching module 180, a voltage detection module 190, a switch control module 200, a current protection module 210, an impedance detection module 220, a temperature determination module 230, and a particulate mass module 240. In some forms, at least a portion of the power regulator module 160 is located on or communicatively coupled with a microcontroller that includes a processor configured to execute instructions stored in a nontransitory computer-readable medium, such as a RAM and/or a ROM.

The switching module 180 is configured to receive the electrical power from the power supply 150 and output a pulse width modulated (PWM) signal. As shown in FIG. 2B, the switching module 180 may include a plurality of switching devices 182-1, 182-2, 182-3, 182-4 (collectively referred to as switching devices 182), a step-down voltage converter 184, and one or more resistors 186. Switching device 182-1 and switching device 182-2 form a first electrical loop. Switching device 182-1, switching device 182-3, and the step-down voltage converter 184 form a second electrical loop. Switching device 182-1, switching device 182-4, and the one or more resistors 186 form a third electrical loop. In some forms, the switching devices 182 may be at least one of a bipolar junction transistor (BJT), an insulated gate bipolar transistor (IGBT), a metal-oxide semiconductor field-effect transistor (MOSFET), and/or the like. The step-down voltage converter 184 may be various DC-to-DC voltage converters, such as a buck converter, a voltage regulator integrated circuit, and/or the like. The operation of the switching devices 182 may be controlled by the switch control module 200, as described below in further detail.

The voltage detection module 190 is configured to detect a voltage magnitude of the PWM signal output by the switching module 180. As an example, the voltage detection module 190 may include one or more resistors that form a voltage divider with the switching module 180 and/or the switch control module 200, an operational amplifier configured to detect the voltage magnitude, an integrated circuit configured to detect the voltage magnitude, an analog-to-digital converter (ADC) configured to output a digital signal representing the voltage magnitude, among others. The voltage magnitude may be provided to the switch control module 200, which subsequently controls the operation of the switching devices 182 based on the voltage magnitude, as described below in further detail.

The switch control module 200 is configured to control the operation of the switching devices 182 based on at least one of the voltage magnitude as determined by the voltage detection module 190, the engine state information provided by the engine state module 170, an amount of accumulated particulate mass in the particulate filter 138, and the temperature of particulate filter 138 as determined by the temperature determination module 230. To control the operation of the switching devices 182, the switch control module 200 is configured to selectively provide a biasing voltage to the switching devices 182 (as indicated by the dotted arrows of FIG. 2B), thereby activating or deactivating the switching devices 182, the step-down voltage converter 184, and/or the resistor 186. Furthermore, the switch control module 200 may include an additional step-down voltage converter to convert the voltage magnitude of the electrical signal received from the power supply 150 to the biasing voltage magnitude.

The current protection module 210 is configured to limit the amount of current provided to the component of the exhaust aftertreatment system 134 when the power regulator module 160 is activated (e.g., turned on) and during steady-state operation of the power regulator module 160. Likewise, the current protection module 210 is configured to limit the amount of reverse current provided to the power regulator module 160 when the power regulator module 160 is deactivated (e.g., turned off). In some forms, the current protection module 210 may include a fuse, a thermistor, a network of transistors and/or diodes, among others.

The impedance detection module 220 is configured to generate a signal indicating the impedance value of the particulate filter 138 when the component receives electrical power from the power regulator module 160. The impedance detection module 220 may include various combinations of passive or active electronic components used to indicate the impedance value of the particulate filter 138. As an example, the impedance detection module 220 may include one or more resistors electrically coupled to the particulate filter 138 such that a voltage divider circuit is formed. Based on the known resistance of the one or more resistors, the voltage magnitude of the PWM signal as determined by the voltage detection module 190, and a voltage magnitude of a common node of the one or more resistors and the particulate filter 138, the impedance detection module 220 is configured to generate the signal indicating the resistance of the particulate filter 138. As another example, the impedance detection module 220 may include a resistor-capacitor (RC) network, a resistor-inductor (RL) network, or a resistor-capacitor-inductor (RLC) network electrically coupled to the particulate filter 138 such that a voltage divider circuit is formed. Based on the known reactance of the RC network, RL network, or RLC network, the voltage magnitude of the PWM signal as determined by the voltage detection module 190, and a voltage magnitude of a common node of one of the RC network, RL network, or RLC network and the particulate filter 138, the impedance detection module 220 is configured to generate the signal indicating the reactance of the particulate filter 138.

The temperature determination module 230 is configured to determine the temperature of the particulate filter 138 based on the impedance value received from the impedance detection module 220. In some forms, the temperature determination module 230 determines the temperature by referencing a lookup table that correlates various impedance values with corresponding temperatures.

Referring to FIGS. 1A, 2A-2B and 3, the operation of the power regulator module 160 and the exhaust aftertreatment system 134 will now be provided. Particularly, FIG. 3 shows a temperature graph 300 for the temperature of the particulate filter 138 versus time, an engine speed graph 310 for the engine speed (i.e., revolutions per minute (RPM)) of the ICE 100 versus time, and a particulate mass graph 320 for the accumulated particulate mass in the particulate filter 138 versus time. FIG. 3 also shows a power graph 330 for the power output by the power regulator module 160 versus time, and an impedance graph 340 for the impedance of the particulate filter 138 versus time. Also, when the vehicle 10 is turned on, as indicated by time $T_0$ in temperature graph 300, engine speed graph 310, particulate mass graph 320, electric power graph 330, and impedance graph 340, the vehicle 10 may be set to the electric propulsion mode.

When the vehicle 10 is set to the electric propulsion mode, the power regulator module 160 is configured to output an electrical signal to the particulate filter 138 such that the temperature of the particulate filter 138 is greater than or equal to a light-off temperature threshold 304, as indicated by temperature curve 302 (temperature graph 300) and based on the corresponding impedance curve 342 (impedance graph 340).

As an example, when the vehicle 10 is turned on at $T_0$, the switch control module 200 may selectively activate switching device 182-1 and switching device 182-2 such that power signal 331 (electric power graph 330) is provided to the particulate filter 138 (e.g., switching devices 182-1, 182-2 are turned on and off from $T_0$ to $T_1$ such that the power signal 331 has a predefined pulse width and/or amplitude, among others).

Once a torque request signal is received indicating a request for activating the ICE 100 at time $T_1$ (e.g., the torque request signal indicates a transition from the electric propulsion mode to one of the hybrid propulsion mode and the ICE propulsion mode), exhaust gas begins to flow through the exhaust aftertreatment system 134 as a result of the vehicle 10 being set to one of the hybrid propulsion mode and the ICE propulsion mode. As such, the RPM of the ICE 100 increases to provide the vehicle 10 sufficient torque when the torque request signal is received, as indicated by RPM curve 312.

Furthermore, when the torque request signal is received indicating the request to activate the ICE 100 at $T_1$ and exhaust gas begins to flow through the exhaust gas aftertreatment system 134, the power regulator module 160 decreases at least one of the pulse width and an amplitude of the signal provided to the particulate filter 138. That is, with exhaust gas from the ICE 100 flowing through the particulate filter 138, less or no power is needed to ensure the temperature of the particulate filter 138 is greater than or equal to the light-off temperature threshold 304. In some forms, the switch control module 200 may selectively activate switching devices 182 such that temperature assist signal 332 is provided to particulate filter 138. As an example, to generate the temperature assist signal 332 at $T_1$, the switch control module 200 may deactivate switching device 182-2 (which was activated at $T_0$) and selectively activate switching devices 182-1, 182-3, 182-4 to reduce the pulse width and the pulse amplitude. By providing the temperature assist signal 332 and in response to the exhaust gas flowing through the exhaust aftertreatment system 134, the temperature of the particulate filter 138 increases, as indicated by the temperature curve 302 and the corresponding impedance curve 342.

In one variation, when the vehicle 10 is set from the electric propulsion mode to one of the hybrid propulsion mode and the ICE propulsion mode at $T_1$, the power regulator module 160 may discontinue supplying electrical power to the particulate filter 138. Accordingly, to discontinue supplying electrical power, the switch control module 200 may deactivate each of the switching devices 182 of the switching module 180.

Additionally, once the torque request signal is received indicating a request for activating the ICE 100 at $T_1$, particulate mass begins to accumulate in the particulate filter 138 as a result of the exhaust gas flowing through the exhaust aftertreatment system 134, as shown in particulate mass graph 320. When the amount of particulate mass reaches a threshold particulate mass 324, the engine controller 115 may begin to initiate a particulate filter regeneration routine, e.g., by running a lean exhaust gas through the particulate filter 138, such that accumulated particulate mass is oxidized and removed from the particulate filter 138. While the particulate mass graph 320 illustrates the amount of particulate mass reaching the threshold at a time between $T_1$ and $T_2$, it should be understood that the amount of particulate mass reaches the threshold particulate mass 324 at any time. Accordingly, the power regulator module 160 may adjust at least one of the pulse width and the amplitude of the electrical power provided to the particulate filter 138 in response to the engine controller 115 initiating the particulate filter regeneration routine.

When the RPM of the ICE 100 decreases at $T_2$ and while performing the particulate filter regeneration routine at $T_2$, the power regulator module 160 increases at least one of the pulse width and an amplitude of the signal provided to the particulate filter 138. In some forms, the switch control module 200 may selectively activate switching devices 182 such that regeneration assist signal 333 is provided to particulate filter 138. As an example, to generate the regeneration assist signal 333 at $T_2$, the switch control module 200 may selectively activate at least one of the switching devices 182 to increase the pulse width and the pulse amplitude. By providing the regeneration assist signal 333, the temperature of the particulate filter 138 continues to increase while the exhaust gas flows through the exhaust aftertreatment system 134, as indicated by the temperature curve 302 and the corresponding impedance curve 342. Accordingly, the oxidization and the removal of the accumulated particulate mass from the particulate filter 138 continues while the RPM of the ICE 100 is decreased (e.g., the vehicle 10 is idle).

When the RPM of the ICE 100 increases and the temperature of the particulate filter 138 reaches a maximum operating temperature 306 at $T_3$, and while performing the particulate filter regeneration routine described above at $T_3$, the power regulator module 160 decreases at least one of the pulse width and an amplitude of the signal provided to the particulate filter 138. In some forms, the switch control module 200 may selectively activate switching devices 182 such that temperature reduction signal 334 is provided to particulate filter 138. As an example, to generate the temperature reduction signal 334 at $T_3$, the switch control module 200 may selectively activate at least one of the switching devices 182 to increase the pulse width and the pulse amplitude. By providing the temperature reduction signal 334, the temperature of the particulate filter 138 decreases and does not exceed the maximum operating temperature 306, as indicated by the temperature curve 302 and the corresponding impedance curve 342.

In some variations of the present disclosure, the RPM of the ICE 100 increases as a result of the temperature of the particulate filter 138 reaching or approaching the maximum operating temperature 306. For example, in the event the particulate filter regeneration routine is being executed between times $T_2$ and $T_3$, oxidation of particulate matter in the particulate filter 138 can continue even though the RPM of the ICE 100 decreases (e.g., the vehicle 10 approaches a STOP sign or slow traffic). Also, with continued increasing temperature of the particulate filter 138 between times $T_2$ and $T_3$, and without sufficient exhaust gas flowing therethrough to remove heat generated by the particulate matter oxidation, runaway oxidation can occur such that the particulate filter 138 is damaged by temperatures (of the particulate filter 136) going above the maximum operating temperature 306. Accordingly, the engine controller 115 can command an increase in RPM of the ICE 100 such that exhaust gas flows through and assists cooling the particulate filter 138 at times between $T_3$ and $T_4$. Also, in some variations the engine controller 115 can command a rich exhaust gas from the ICE 100 such that exhaust gas flowing through the particulate filter 138 is "starved" of oxygen and thereby reduce the amount of particulate matter oxidation within (and assist in cooling) the particulate filter 138 between times $T_3$ and $T_4$.

Once the temperature of the particulate filter 138 reaches a desired steady state temperature 308 at $T_4$ and while performing the particulate filter regeneration routine at $T_4$, the power regulator module 160 increases at least one of the pulse width and an amplitude of the signal provided to the particulate filter 138. In some forms, the switch control module 200 may selectively activate switching devices 182 such that burst signal 335 is provided to the component of the exhaust aftertreatment system 134. As an example, to generate the burst signal 335 at $T_4$, the switch control module 200 may selectively activate at least one of the switching devices 182 to increase the pulse width and the pulse amplitude. By providing the burst signal 335, the temperature of the component of the exhaust aftertreatment system 134 increases and is inhibited from falling below the desired steady state temperature 308.

When the vehicle 10 transitions from one of the hybrid propulsion mode and the ICE propulsion mode to the electric propulsion mode at $T_5$ (i.e., the RPM of the ICE 100 decreases to 0 at $T_5$) and/or when the particulate filter regeneration routine is complete at $T_5$, the power regulator module 160 increases at least one of the pulse width and an amplitude of the signal provided to the particulate filter 138. In some forms, the switch control module 200 may selectively activate switching devices 182 such that power signal 336 is provided to particulate filter 138. As an example, to generate the power signal 336 at $T_5$, the switch control module 200 may selectively activate at least one of the switching devices 182 to increase the pulse width and the pulse amplitude. By providing the power signal 336, the temperature of the particulate filter 138 remains at a value that is greater than or equal to the light-off temperature threshold 304.

Referring to FIGS. 1A, 2A-2B, 3, and 4, an example routine 400 is shown. At 404, the vehicle 10 is set to the electric propulsion mode when, for example, the vehicle 10 is turned on. At 408, the vehicle 10 determines whether a torque request signal indicates that the activation of the ICE 100 is required (i.e., the torque request signal indicates a switch from the electric propulsion mode to one of the hybrid propulsion mode and the ICE propulsion mode). If the torque request signal indicates that the activation of the ICE 100 is required, the vehicle 10 is set to one of the hybrid propulsion mode and the ICE propulsion mode at 412 and then proceeds to 416. Conversely, the routine 400 proceeds to 404 if the torque request signal indicates that the activation of the ICE 100 is not required. At 416, the routine 400 performs the non-electric mode impedance monitoring routine, which is described below in further detail with reference to FIG. 5. The routine 400 then proceeds to 408.

Referring to FIGS. 1A, 2A-2B, 3, and 4-5, an example routine 500 is shown. The routine 500 represents an example routine for performing the non-electric mode impedance detection routine described at step 416 of FIG. 4. At 504, the power regulator module 160 provides the temperature assist signal 332 to the particulate filter 138. At 508, the engine state module 170 determines whether the RPM of the ICE 100 is less than a lower threshold RPM. As an example, the lower threshold RPM may be associated with the vehicle 10 being in an idle state. If the RPM of the ICE 100 is less than the lower threshold RPM, the routine 500 proceeds to 512. Conversely, if the RPM of the ICE 100 is greater than or equal to the lower threshold RPM, the routine 500 proceeds to 504.

At 512, the engine controller 115 determines whether the amount of particulate mass is greater than a threshold particulate mass threshold. If so, the routine 500 proceeds to 524, otherwise, the routine 500 proceeds to 516. At 516, the power regulator module 160 determines whether the temperature of the particulate filter 138, as indicated by the measured impedance, is equal to the maximum operating temperature 306. If so, the power regulator module 160 discontinues supplying electric power to the particulate filter at 520 and then proceeds to 508. Conversely, if the temperature of the particulate filter 138 is less than the maximum operating temperature 306, the routine 500 proceeds to 504.

At 524, the power regulator module 160 provides the regeneration assist signal 333 to the particulate filter 138. At 528, the routine 500 determines whether the temperature of the particulate filter 138, as indicated by the measured impedance, is equal to the maximum operating temperature 306. If so, the power regulator module 160 provides the temperature reduction signal 334 to the particulate filter 138 at 532 and then proceeds to 536. Conversely, if the temperature of the particulate filter 138 is less than the maximum operating temperature 306, the routine 500 proceeds to 524. It should be understood that in the alternative, or addition to, providing a temperature reduction signal to the particulate filer 138 at 532 when the temperature of the particulate filter 138 is equal to (or greater than) the maximum operating temperature 306, the engine controller 115 can command an increase in RPM of the ICE 100 such that exhaust gas flows through and assists cooling the particulate filter 138 as discussed above.

At 536, the engine state module 170 determines whether the RPM of the ICE 100 is greater than an upper threshold RPM, which is greater than the lower threshold RPM. If the RPM of the ICE 100 is greater than the upper threshold RPM, the routine 500 proceeds to 540, where the power regulator module 160 provides the burst signal 335 and then proceeds to 544. Conversely, if the RPM of the ICE 100 is less than or equal to the upper threshold RPM, the routine 500 proceeds to 532. At 544, the engine controller 115 determines whether the amount of particulate mass is greater than the threshold particulate mass threshold. If so, the routine 500 proceeds to 548, otherwise, the routine 500 proceeds to 552.

At 548, the engine controller 115 adjusts the λ value of the exhaust gas flowing through the exhaust aftertreatment system 134, as indicated by at least one of the UHEGO sensors 147a, 147b. For example, at 548 the engone controller 115 may command a lean exhaust gas from the ICE 100 such that additional oxygen is present in the exhaust gas and thereby enhance oxidation of particulate matter in the particulate filter 138. To adjust the λ value of the exhaust gas, the engine controller 115 may control the flow of air (including volume of air) into and out of the one or more cylinders 120, for a predetermined amount of time such that a deactivated cylinder intake air pass-through volume flows through the at least one deactivated cylinder 120, into the exhaust pipe 132, and through the catalytic converter 136 and the particulate filter 138. That is, the engine controller 115 deactivates one or more cylinders 120 by directing the valves 122 (i.e., the intake valve and the exhaust valve) of each deactivated cylinder 120 to remain open for a first predetermined amount of time, the fuel injector 124 of each deactivated cylinder to remain closed for a second predetermined amount of time, and the spark initiator 126 of each deactivated cylinder 120 not to provide a spark for one or more combustion cycles. In some variations, the first predetermined amount of time is equal to the second predetermined amount of time, while in other variations the first predetermined amount of time is not equal to the second predetermined amount of time. Accordingly, any remaining particulate mass of the particulate filter 138 is oxidized. The routine 500 then proceeds to 544.

At 552, the vehicle 10 generates a report based on the impedance and/or temperature of the particulate filter 138 and/or sensor data obtained from one of the sensors. As an example, the engine controller 115 may generate a report in response to the impedance and/or an impedance change with respect to time of the particulate filter 138 exceeding a predefined threshold, where the predefined threshold is associated with structural damage of the particulate filter 138. As another example, the engine controller 115 may generate a report in response to the temperature and/or a temperature change with respect to time of the particulate filter 138 exceeding a predefined threshold, where the predefined threshold is associated with structural damage of the particulate filter 138. In some forms, the predefined thresholds may be stored in a lookup table of the engine controller 115.

As yet another example, the engine controller 115 may generate a report indicating the particulate mass accumulation in the particulate filter 138 based on sensor data obtained by the pre-converter and post-converter particulate sensors 148*a*, 148*b* and the pre-converter and post-converter pressure sensors 149*a*, 149*b*. As still yet another example, the engine controller 115 may generate a report indicating a pressure difference and corresponding structural damage of the particulate filter 138 based on sensor data obtained by the pre-converter and post-converter pressure sensors 149*a*, 149*b*. The routine 500 then ends.

It should be understood that routines 400, 500 are merely example control routines and other control routines may be implemented.

By selectively applying electrical power to the particulate filter 138 when one or more temperature metrics are satisfied (e.g., when the temperature is greater than or equal to the light-off temperature threshold 304 or equal to the maximum operating temperature 306) and/or one or more engine state metrics are satisfied (e.g., the torque request signal indicates a request to activate the ICE 100, a propulsion mode change, and/or the engine speed is less than a threshold speed value), the power regulator module 160 can accurately control and monitor the temperature of the particulate filter 138 without using temperature sensors and while operating in various vehicle propulsion modes, such as the electric propulsion mode, the hybrid propulsion mode, and the ICE propulsion mode. In this manner, an electrically heated particulate filter 138 can be heated during operation of the vehicle 10 while operating at various engine speeds in the hybrid propulsion mode or the ICE propulsion mode, thereby enabling particulate mass that accumulates in the particulate filter 138 to be oxidized in any one of the propulsion modes described herein. Accordingly, thermal runaway and possible damage to the particulate filter 138 during any one of the propulsion modes and/or during a transition between one of the propulsion modes is prevented or inhibited.

Based on the foregoing, the following provides a general overview of the present disclosure and is not a comprehensive summary.

In some forms of the present disclosure, the temperature of the particulate filter satisfies the one or more temperature metrics when the temperature of the particulate filter is equal to a maximum temperature threshold. In some forms, adjusting the magnitude of the electric power in response to the temperature of the particulate filter satisfying the one or more temperature metrics further includes decreasing at least one of a pulse width of the electric power and an amplitude of the electric power.

In some forms of the present disclosure, the temperature of the particulate filter satisfies the one or more temperature metrics when the temperature of the particulate filter is equal to a minimum temperature threshold. In some forms, adjusting the magnitude of the electric power in response to the temperature of the particulate filter satisfying the one or more temperature metrics further includes increasing at least one of a pulse width of the electric power and an amplitude of the electric power.

In some forms of the present disclosure, the engine state information includes a torque request signal, and the engine state information satisfies the one or more engine state metrics in response to the torque request signal indicating a request to activate an internal combustion engine. In some forms, adjusting the magnitude of the electric power in response to satisfying the one or more engine state metrics further includes increasing at least one of a pulse width of the electric power and an amplitude of the electric power.

In some forms of the present disclosure, the engine state information includes an engine speed value, and the engine state information satisfies the one or more engine state metrics in response to the engine speed value being less than a threshold engine speed value. In some forms, adjusting the magnitude of the electric power in response to satisfying the one or more engine state metrics further includes increasing at least one of a pulse width of the electric power and an amplitude of the electric power.

In some forms, the engine state information includes propulsion mode information, and the engine state information satisfies the one or more engine state metrics in response to the propulsion mode information indicating that an internal combustion engine is activated.

In some forms of the present disclosure, obtaining the impedance value of the particulate filter in response to providing the electric power further includes obtaining an impedance value from an impedance detection circuit in response to providing the electric power, where the impedance detection circuit is electrically coupled to the particulate filter. In some forms, obtaining the impedance value of the particulate filter in response to providing the electric power further includes determining the impedance value of the particulate filter based on the impedance value of the impedance detection circuit.

In some forms of the present disclosure, providing the electric power to the particulate filter further includes selectively activating one or more switches of a switching circuit, where the switching circuit electrically couples the particulate filter and a power supply.

In some forms of the present disclosure, the method includes determining the amount of particulate mass in the particulate filter of the particulate filter based on a pressure value generated by a particulate sensor.

In some forms of the present disclosure, the temperature of the particulate filter satisfies the one or more temperature metrics when the temperature of the particulate filter is equal to a maximum temperature threshold. In some forms, the instructions for adjusting the magnitude of the electric power in response to the temperature of the particulate filter satisfying the one or more temperature metrics further include decreasing at least one of a pulse width of the electric power and an amplitude of the electric power.

In some forms of the present disclosure, the temperature of the particulate filter satisfies the one or more temperature metrics when the temperature of the particulate filter is equal to a minimum temperature threshold. In some forms, the instructions for adjusting the magnitude of the electric power in response to the temperature of the particulate filter satisfying the one or more temperature metrics further include increasing at least one of a pulse width of the electric power and an amplitude of the electric power.

In some forms of the present disclosure, the engine state information includes a torque request signal, and the engine state information satisfies the one or more engine state metrics in response to the torque request signal indicating a request to activate an internal combustion engine. In some forms, the instructions for adjusting the magnitude of the electric power in response to satisfying the one or more engine state metrics further include increasing at least one of a pulse width of the electric power and an amplitude of the electric power.

In some forms of the present disclosure, the engine state information includes an engine speed value, and the engine state information satisfies the one or more engine state metrics in response to the engine speed value being less than a threshold engine speed value. In some forms, the instructions for adjusting the magnitude of the electric power in response to satisfying the one or more engine state metrics further include increasing at least one of a pulse width of the electric power and an amplitude of the electric power.

In some forms of the present disclosure, the engine state information includes propulsion mode information, and the engine state information satisfies the one or more engine state metrics in response to the propulsion mode information indicating that an internal combustion engine is activated.

In some forms of the present disclosure, the instructions for obtaining the impedance value of the particulate filter in response to providing the electric power further include obtaining an impedance value from an impedance detection circuit in response to providing the electric power, where the impedance detection circuit is electrically coupled to the particulate filter. In some forms, the instructions for obtaining the impedance value of the particulate filter in response to providing the electric power further include determining the impedance value of the particulate filter based on the impedance value of the impedance detection circuit.

In some forms of the present disclosure, providing electric power to the particulate filter further includes selectively activating one or more switches of a switching circuit, where the switching circuit electrically couples the particulate filter and a power supply.

In some forms of the present disclosure, the instructions further include determining the amount of particulate mass in the particulate filter of the particulate filter based on a pressure value generated by a particulate sensor.

In some forms of the present disclosure, the temperature of the particulate filter satisfies the one or more temperature metrics when the temperature of the particulate filter is equal to a maximum temperature threshold. In some forms, the instructions for adjusting the magnitude of the electric power in response to the temperature of the particulate filter satisfying the one or more temperature metrics further include decreasing at least one of a pulse width of the electric power and an amplitude of the electric power.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
   determining an amount of particulate mass in a particulate filter of an exhaust aftertreatment system; and
   when the amount of particulate mass in the particulate filter is greater than a threshold particulate mass value:
      receiving engine state information, wherein the engine state information includes an engine speed value;
      providing electric power to the particulate filter;
      obtaining an impedance value of the particulate filter in response to providing the electric power;
      determining a temperature of the particulate filter based on the impedance value; and
      adjusting at least one of a pulse width and an amplitude of the electric power based on a comparison between (i) the engine speed value to a maximum threshold engine speed value and a minimum threshold engine speed value and (ii) the temperature to a maximum temperature threshold.

2. The method of claim 1, wherein adjusting at least one of the pulse width and the amplitude of electric power based on the comparison between the temperature to the maximum temperature threshold further comprises decreasing at least one of the pulse width and the amplitude when the temperature is equal to the maximum temperature threshold.

3. The method of claim 1, wherein adjusting at least one of the pulse width and the amplitude of electric power based on the comparison between (i) the engine speed value to the maximum threshold engine speed value and the minimum threshold engine speed value and (ii) the temperature to the maximum temperature threshold further comprises increasing at least one of the pulse width and the amplitude when the temperature is less than the maximum temperature threshold and when the engine speed value is less than the minimum threshold engine speed value.

4. The method of claim 1, wherein:
   the engine state information further comprises a torque request signal; and
   in response to the torque request signal indicating a request to activate an internal combustion engine, increasing at least one of the pulse width and the amplitude.

5. The method of claim 1, wherein adjusting at least one of the pulse width and the amplitude of electric power based on the comparison between (i) the engine speed value to the maximum threshold engine speed value and the minimum threshold engine speed value and (ii) the temperature to the maximum temperature threshold further comprises increasing at least one of the pulse width and the amplitude when the engine speed value is greater than the maximum threshold engine speed value and the temperature is less than the maximum temperature threshold.

6. The method of claim 1, wherein:
   the engine state information comprises propulsion mode information; and
   increasing at least one of the pulse width and the amplitude in response to the propulsion mode information indicating that an internal combustion engine is activated.

7. The method of claim 1, wherein obtaining the impedance value of the particulate filter in response to providing the electric power further comprises:
   obtaining an impedance value from an impedance detection circuit in response to providing the electric power, wherein the impedance detection circuit is electrically coupled to the particulate filter; and
   determining the impedance value of the particulate filter based on the impedance value of the impedance detection circuit.

8. The method of claim 1, wherein providing the electric power to the particulate filter further comprises selectively activating one or more switches of a switching circuit, wherein the switching circuit electrically couples the particulate filter and a power supply.

9. The method of claim 1 further comprising determining the amount of particulate mass in the particulate filter based on a pressure value generated by a pressure sensor.

10. A system comprising:
    a processor; and
    a nontransitory computer-readable medium comprising instructions that are executable by the processor, wherein the instructions comprise:
       determining an amount of particulate mass in a particulate filter of an exhaust aftertreatment system; and
       when the amount of particulate mass in the particulate filter is greater than a threshold particulate mass value:
          receiving engine state information, wherein the engine state information includes an engine speed value;
          providing electric power to the particulate filter;
          obtaining an impedance value of the particulate filter in response to providing the electric power;
          determining a temperature of the particulate filter based on the impedance value; and
          adjusting at least one of a pulse width and an amplitude of the electric power based on a comparison between (i) the engine speed value to a maximum threshold engine speed value and a minimum threshold engine speed value and (ii) the temperature to a maximum temperature threshold.

11. The system of claim 10, wherein the instructions for adjusting at least one of the pulse width and the amplitude of electric power based on the comparison between the temperature to the maximum temperature threshold further comprise decreasing at least one of the pulse width and the amplitude when the temperature is equal to the maximum temperature threshold.

12. The system of claim 10, wherein the instructions for adjusting at least one of the pulse width and the amplitude of electric power based on the comparison between (i) the engine speed value to the maximum threshold engine speed value and the minimum threshold engine speed value and (ii) the temperature to the maximum temperature threshold further comprise increasing at least one of the pulse width and the amplitude when the temperature is less than the maximum temperature threshold and when the engine speed value is less than the minimum threshold engine speed value.

13. The system of claim 10, wherein:
    the engine state information further comprises a torque request signal; and
    the instructions further comprise increasing at least one of the pulse width and the amplitude in response to the torque request signal indicating a request to activate an internal combustion engine.

14. The system of claim 10, wherein the instructions for adjusting at least one of the pulse width and the amplitude of electric power based on the comparison between (i) the engine speed value to the maximum threshold engine speed value and the minimum threshold engine speed value and (ii) the temperature to the maximum temperature threshold further comprise increasing at least one of the pulse width and the amplitude when the engine speed value is greater than the maximum threshold engine speed value and the temperature is less than the maximum temperature threshold.

15. The system of claim 10, wherein:
the engine state information comprises propulsion mode information; and
the instructions further comprise increasing at least one of the pulse width and the amplitude in response to the propulsion mode information indicating that an internal combustion engine is activated.

16. The system of claim 10, wherein the instructions for obtaining the impedance value of the particulate filter in response to providing the electric power further comprise:
obtaining an impedance value from an impedance detection circuit in response to providing the electric power, wherein the impedance detection circuit is electrically coupled to the particulate filter; and
determining the impedance value of the particulate filter based on the impedance value of the impedance detection circuit.

17. The system of claim 10, wherein providing electric power to the particulate filter further comprises selectively activating one or more switches of a switching circuit, wherein the switching circuit electrically couples the particulate filter and a power supply.

18. The system of claim 10, wherein the instructions further comprise determining the amount of particulate mass in the particulate filter based on a pressure value generated by a pressure sensor.

19. A vehicle comprising:
an exhaust aftertreatment system comprising a particulate filter;
a processor; and
a nontransitory computer-readable medium comprising instructions that are executable by the processor, wherein the instructions comprise:
determining an amount of particulate mass in the particulate filter; and
when the amount of particulate mass in the particulate filter is greater than a threshold particulate mass value:
receiving engine state information, wherein the engine state information includes an engine speed value;
providing electric power to the particulate filter;
obtaining an impedance value of the particulate filter in response to providing the electric power;
determining a temperature of the particulate filter based on the impedance value; and
adjusting at least one of a pulse width and an amplitude of the electric power based on a comparison between (i) the engine speed value to a maximum threshold engine speed value and a minimum threshold engine speed value and (ii) the temperature to a maximum temperature threshold.

20. The vehicle of claim 19, wherein the instructions for adjusting at least one of the pulse width and the amplitude of electric power based on the comparison between the temperature to the maximum temperature threshold further comprise decreasing at least one of the pulse width and the amplitude when the temperature is equal to the maximum temperature threshold.

* * * * *